United States Patent [19]

Dakin

[11] Patent Number: 4,853,534
[45] Date of Patent: Aug. 1, 1989

[54] OPTICAL FIBER SENSING SYSTEM
[75] Inventor: John P. Dakin, Hampshire, England
[73] Assignee: Plessey Overseas Limited, Illford, England
[21] Appl. No.: 166,932
[22] Filed: Mar. 11, 1988
[30] Foreign Application Priority Data
 Mar. 11, 1987 [GB] United Kingdom ............ 8705772
[51] Int. Cl.$^4$ .................................. G01B 9/02
[52] U.S. Cl. ............................ 250/227; 250/231 P; 356/345
[58] Field of Search ........... 250/227, 231 R, 231 P; 356/35.5, 345, 349, 350, 359, 360

[56] References Cited
U.S. PATENT DOCUMENTS
4,634,852 1/1987 Shaw .................................. 356/345
4,767,210 8/1988 Kashyap ............................ 250/227

Primary Examiner—Edward P. Westin
Attorney, Agent, or Firm—Fleit, Jacobson, Cohn, Price, Holman & Stern

[57] ABSTRACT

An optical fibre sensing system for monitoring and/or measuring temperatures or pressures distributed around an optical fibre sensing loop. Light source and coupler are provided for applying continuous wave light to the loop so that the light propagates simultaneously in opposite directions around the loop with the resultant light output from the loop being detected by a detector. Light pulse generating source and coupler cause light pulses to propagate in one direction only around the loop and by so doing produce transient variations in the propagation constant along the looped fibre in dependence upon the distributed temperature or pressure around the loop. The detector detects the phase changes occurring in the continuous wave light received from the sensing loop due to variations in temperature or pressure around the loop.

7 Claims, 1 Drawing Sheet

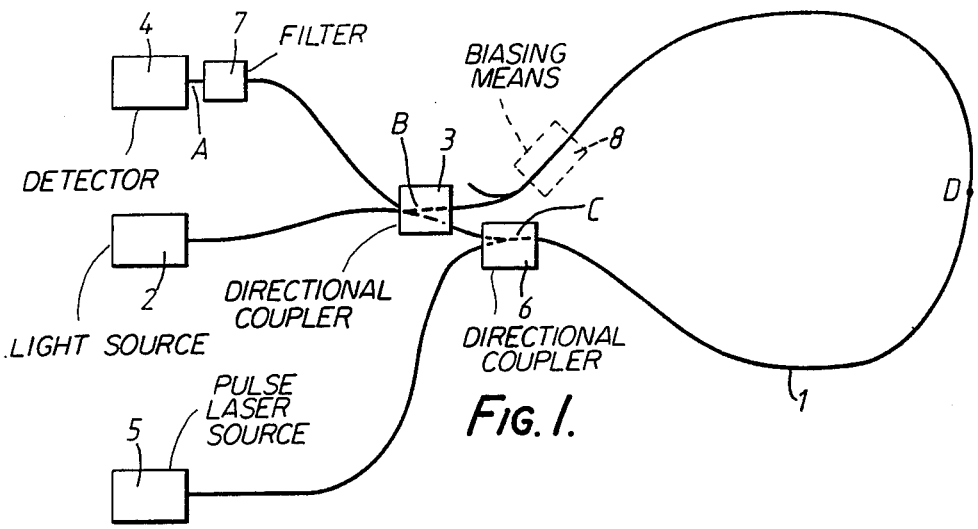
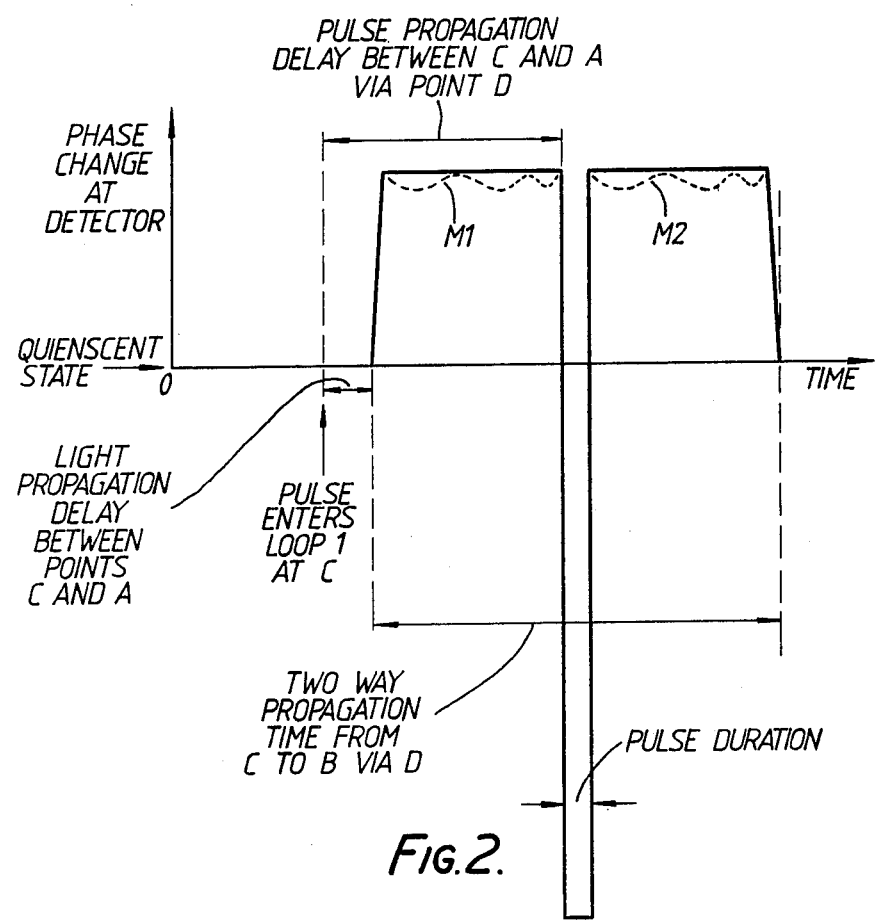

OPTICAL FIBER SENSING SYSTEM

BACKGROUND OF THE INVENTION

This invention relates to optical fibre sensing systems for monitoring and/or measuring temperatures or pressures distributed over a pre-determined path.

In our co-pending British Patent Application No. 8609733 (published under Ser. No. 2,207,236 on Jan. 25, 1989), to which attention is hereby directed, an optical fibre sensing system comprises an optical interferometer having measurement and reference optical paths in parallel relationship, the measurement path comprising an optical fibre extending over the path along which distributed temperature or pressure is to be measured, continuous wave light generating means producing coherent continuous wave light which propagates in one direction along the measurement and reference paths of the interferometer, pulse light generating means for producing light pulses which propagate along the measurement path only in the direction opposite to that in which the continuous wave light propagates to produce transient variations in the propagation constant (or its directly related phase change coefficient) of the optical fibre at points therealong according to the temperature or pressure at said points, and detector means for detecting the resultant output from the interferometer which will vary with time in dependence upon the temperature or pressure at distributed points along the measurement optical fibre path.

SUMMARY OF THE INVENTION

The present invention is directed to an optical sensing system of generally similar form to that forming the subject of the above-mentioned co-pending application but which exhibits improved stability and is inherently balanced with potentially better phase-noise characteristics.

According to the present invention there is provided an optical fibre sensing system for monitoring and/or measuring temperatures or pressures distributed over a pre-determined path, in which the pre-determined path comprises an optical fibre defining a sensing loop, in which means are provided for applying continuous wave light to the sensing loop so that the light propagates simultaneously in opposite directions around said loop with the resultant light output from the loop being detected by detector means and in which pulse generating means is provided for generating light pulses which propagate in one direction only around the sensing loop and by so doing produce transient variations in the propagation constant (or phase change coefficient) along the looped optical fibre in dependence upon the distributed temperature or pressure around the loop and in which the detector means detects the phase changes occurring in the continuous wave light received from the sensing loop due to variations in temperature or pressure around the loop.

BRIEF DESCRIPTION OF DRAWING

By way of example the present invention will now be described with reference to the accompanying drawings in which:

FIG. 1 shows a schematic diagram of an optical fibre sensing system according to the present invention; and, FIG. 2 is a diagram depicting the phase changes in light detected at the detector under quiescent and variable temperature or pressure conditions around the sensing loop.

DETAILED DESCRIPTION OF PREFERRED EMBODIMENT

Referring to FIG. 1 of the drawings, the optical sensing system illustrated comprises a Sagnac interferometer including an optical fibre sensing loop 1 to which continuous wave light from a suitable light source 2 (e.g. laser, light-emitting diode or incandescent lamp) is applied through a directional optical fibre coupler 3. The directional coupler 3 allows like components of the continuous wave light to propagate in opposite directions simultaneously around the sensing loop 1 with a proportion of the light returning to the directional coupler 3 being fed to a detector 4 where coherent interference between the light components is detected in the form of a detected signal amplitude which in turn is dependent on the relative phase of each of the continuous wave components received by the detector 4.

In the absence of any physical disturbance around the sensing loop 1, due for example to changes in temperature or pressure at points therealong, the path lengths for the like components travelling around the loop in opposite directions will be effectively the same and therefore there will be no changes in the relative phase of the components, that is to say the components will be in phase with one another. The sensing system of the present invention, however, includes a pulse laser source 5 which is arranged to produce one or more short intense light pulses which are fed into the sensing loop 1 through an optical fibre directional coupler 6. This intense pulse or pulses propagate around the sensing loop 1 in the counter clockwise direction as viewed in FIG. 1 and will disturb the balance of the sensing loop and thereby cause changes in the propagation constant of the sensing loop fibre at points therearound in dependence upon the temperature or pressure at such points. A time varying imbalance will therefore occur in the sensing loop and this imbalance will depend both on the intensity of the pulse or pulses and the temperature of, or pressure exerted on, the optical fibre in that region of the loop through which the clockwise propagating component of the continuous wave light has passed when it is encountered by the anti-clockwise light pulse. After disturbing the balance of the sensing loop to produce changes in the propagation constant thereof the intense pulse or pulses, as the case may be, may be removed by means of a filter 7 before reaching the detector 4. However, the wavelength of the light pulse could alternatively be outside the response range of the detector 4 in which case the filter 7 may be dispensed with. For example, a 1.3 um laser for producing pulses could be used in conjunction with a silicon detector.

If distributed temperature is to be measured, the optical Kerr effect may be utilised where the propagating light pulse changes the refractice index of the loop centre fibre according to temperature.

By referring to FIG. 2 of the drawings, typical phase changes that occur in the interfering light components at the detector under quiescent conditions of the loop and when variations in temperature occur along the length of the loop can be seen, the latter being shown in dotted form. As will be noticed, the variations in phase change which can be measured in the detector to determine the distribution of temperature along the sensing loop are indicated at M1 and M2.

In order to prevent any polarisation effects resulting from changes in the relative states of polarisation of the continuous wave light components propagating around the sensing loop optical fibres and directional couplers used may be of the polarisation maintaining (or polarising) type.

With a view to obtaining the maximum response of the system to the intense pulse or pulses injection into the sensing loop 1, the Sagnac loop interferometer may be biased by the introduction into the loop 1 of biasing means 8. This biasing which may be effected in accordance with any of the methods currently used in processing arrangements for gyroscope systems disturbs the normal in-phase relationship between the counter-propagating components of the continuous wave light received at the detector 4 and causes a relative frequency of phase off-set between the components.

The sensing system depicted in FIG. 1 of the drawings may be improved on to provide better path reciprocity, as by the use of so-called minimum fibre gyroscope configuration for a reciprocal path gyroscope.

I claim:

1. An optical fibre sensing system for monitoring and/or measuring temperatures or pressures distributed over a predetermined path, in which the pre-determined path comprises an optical fibre defining a sensing loop, in which means are provided for applying continuous wave light to the sensing loop so that the light propagates simultaneously in opposite directions around said loop with the resultant light output from the loop being detected by detector means, in which pulse generating means is provided for generating short light pulses which propagate in one direction only around the sensing loop and by so doing produce transient variations in the propogation constant along the looped optical fibre in dependence upon the distributed temperature or pressure around the loop and in which the detector means detects the phase changes occurring in the continuous wave light received from the sensing loop due to variations in temperature or pressure around the loop.

2. An optical fibre sensing system as claimed in claim 1, in which the continuous wave light is fed into the sensing loop and the light output from the sensing loop is fed to the detector means through an optical directional coupler.

3. An optical fibre sensing system as claimed in claim 1, in which the light pulses generated by the pulse generating means are fed into the sensing loop through an optical directional coupler.

4. An optical fibre sensing system as claimed in claim 1, in which the short pulses generated by the pulse generating means are filtered out before reaching the detector means.

5. An optical fibre sensing system as claimed in claim 1, in which the wavelength of the short pulses generated by the pulse generating means is outside the wavelength response range of the detector means.

6. An optical fibre sensing system as claimed in claim 1, in which a polarisation—maintaining optical fibre is utilised for the optical fibre.

7. An optical fibre sensing system as claimed in claim 1, in which the sensing loop includes biasing means to provide maximum response to the pulses.

* * * * *